United States Patent
Jan et al.

(10) Patent No.: US 6,739,062 B2
(45) Date of Patent: May 25, 2004

(54) UNIVERSAL ANGLE MEANS

(75) Inventors: Der-Shyang Jan, Taipei (TW); Wun-Chun Liou, Taipei (TW)

(73) Assignee: Quarton, Inc (TW)

( * ) Notice: Subject to any disclaimer, the term of this patent is extended or adjusted under 35 U.S.C. 154(b) by 0 days.

(21) Appl. No.: 10/215,966

(22) Filed: Aug. 9, 2002

(65) Prior Publication Data

US 2004/0025358 A1 Feb. 12, 2004

(51) Int. Cl.⁷ .............................. G01B 11/26
(52) U.S. Cl. ........................... 33/286; 33/370
(58) Field of Search ................ 33/286, 227, 285, 33/290, 333, 334, 370, 371

(56) References Cited

U.S. PATENT DOCUMENTS

| | | | | |
|---|---|---|---|---|
| 4,731,933 A | * | 3/1988 | Cope ........................... 33/414 |
| 4,986,002 A | * | 1/1991 | Oros et al. .................... 33/354 |
| 5,727,325 A | * | 3/1998 | Mussell ....................... 33/429 |
| 5,894,675 A | * | 4/1999 | Cericola ...................... 33/451 |
| 6,163,969 A | * | 12/2000 | Jan et al. ..................... 33/282 |
| 6,374,507 B1 | * | 4/2002 | Lehto .......................... 33/645 |
| 6,430,823 B1 | * | 8/2002 | Seki ............................ 33/281 |

* cited by examiner

Primary Examiner—Christopher W. Fulton
(74) Attorney, Agent, or Firm—Raymond Sun

(57) ABSTRACT

An angle measurement and distance demarcation device has a body having a first surface, an axis which extends from the first surface, and a containing room. The device also has a rotating unit coupled for rotation about the axis, and a laser emitter. The device further includes a coupling mechanism provided around the axis and coupling the rotating unit to the body, and a power supply unit provided inside the containing room and coupled to the laser emitter for supplying power to laser emitter. The device can be used together with either a triangular angle gauge or a disk angle gauge.

21 Claims, 8 Drawing Sheets

UNIVERSAL ANGLE MEANS

BACKGROUND OF THE INVENTION

1. Field of the Invention

The present invention relates to a universal angle device, and in particular, to a universal angle gauge that emits a laser plane for use in three-dimensional positioning, and which cooperates with either a triangular angle gauge or a disk angle gauge for positioning operations.

2. Description of the Prior Art

For angle measurement in civil engineering applications, the engineer normally pulls a line from an angle gauge to measure an angle position within a short distance or a middle distance. Unfortunately, the pulled line has its own weight, so the line drops down because of gravity during long distance measurement, thereby introducing inaccuracies into the measurement. In addition, the conventional angle gauges and the associated pulled lines are typically used for shorter distance angle measurements because the measured location should be at a distance that an operator can physically reach the location. This is because it will be difficult to use the conventional angle gauges to measure locations that are at a longer distance or at locations where operator cannot physically reach (such as the top of a building, a gap between two buildings or other steep landform, etc.).

To address the problems associated with angle measurement of distant locations, optical instruments (such as telescopes for distance measurement) have been used. Unfortunately, the demarcation achieved by these optical instruments is always variable because different operators will exercise their subjective judgments, thereby leading to inconsistent results. In addition, conventional optical instruments often use tripods to aid in the measurement and positioning of landform, but tripods can be difficult and inconvenient to operate.

SUMMARY OF THE DISCLOSURE

It is an objective of the present invention to provide a universal angle device that provides convenient angle measurement and positioning work.

It is another objective of the present invention to provide a low-cost yet effective universal angle device that has a simple construction and which can be positioned in a manner to minimize human errors.

It is yet another objective of the present invention to provide a universal angle device that can be used with a triangular angle gauge and a disk angle gauge.

It is a further objective of the present invention is to provide a universal angle device that has a compact configuration that can be conveniently used in complex landform applications for angle measurement.

In order to accomplish the objects of the present invention, the present invention provides an angle measurement and distance demarcation device that has a body having a first surface, an axis which extends from the first surface, and a containing room. The device also has a rotating unit coupled for rotation about the axis, and a laser emitter. The device further includes a coupling mechanism provided around the axis and coupling the rotating unit to the body, and a power supply unit provided inside the containing room and coupled to the laser emitter for supplying power to laser emitter. The device can be used together with either a. triangular angle gauge or a disk angle gauge.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
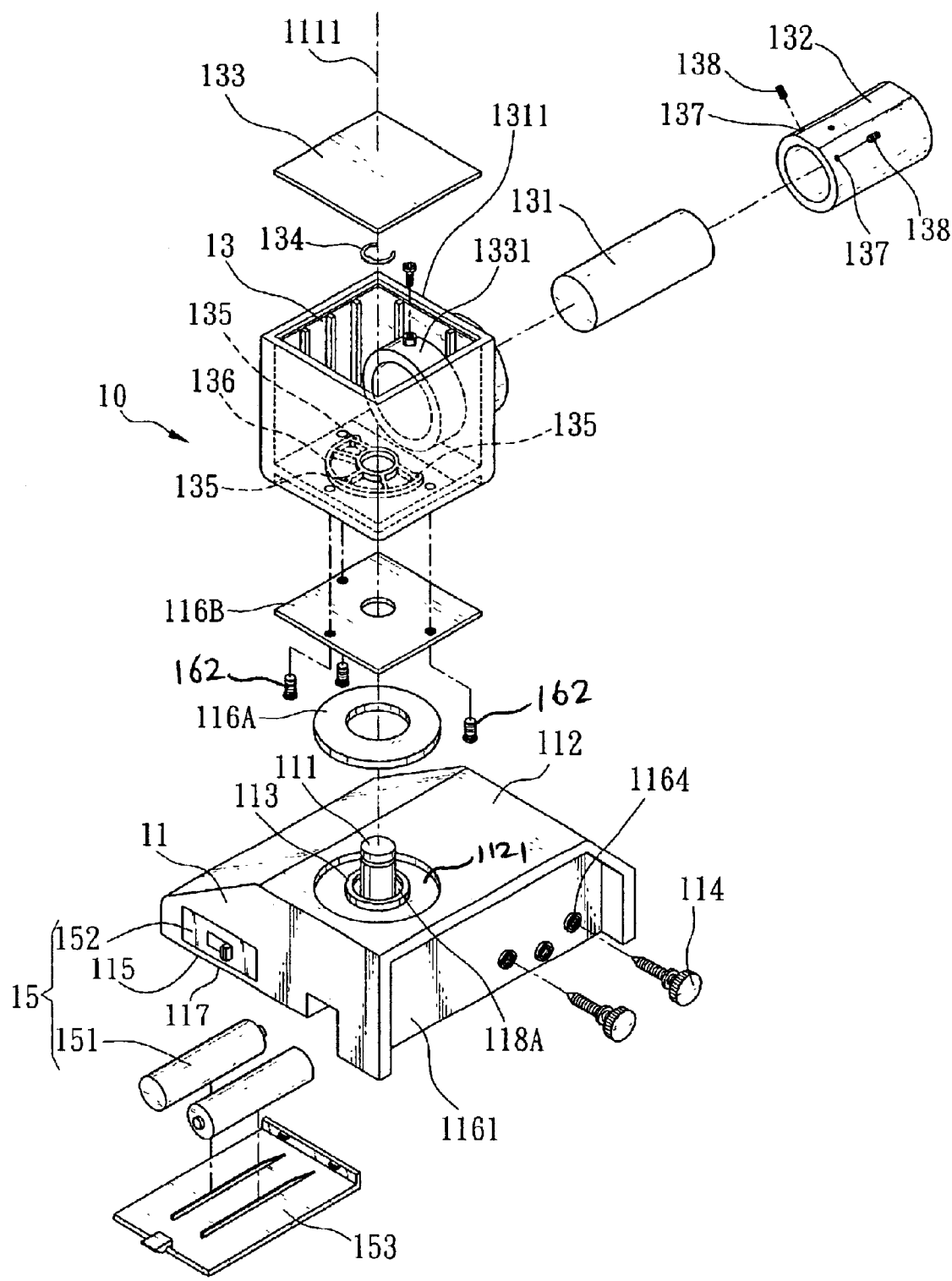
FIG. 1 is an exploded perspective view of a universal angle gauge according to one embodiment of the present invention.
Figure 2:
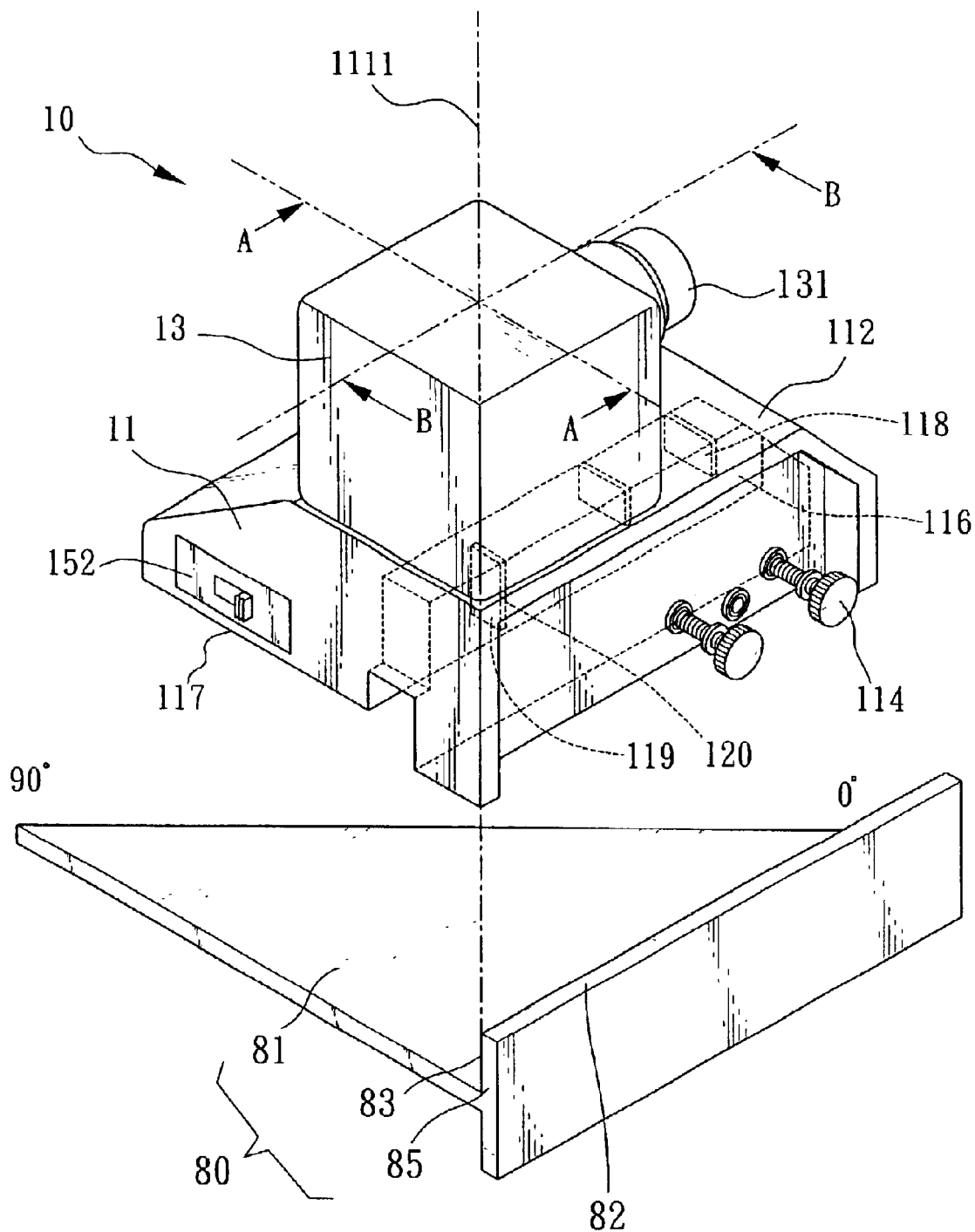
FIG. 2 is an exploded perspective view illustrating the universal angle gauge of FIG. 1 in assembled form, and shown in use with a triangular angle gauge.

FIGS. 1 and 2 illustrate one preferred embodiment of a universal angle gauge 10 according to the present invention. The universal angle gauge 10 has three main parts: a first part that includes a body or base 11, a second part that includes a rotating unit 13, and a third part that includes a power supply unit 15.

The first part has a body 11 that carries a shaft 111 extending from a first or upper surface 112 of the body 11, with the shaft 111 defining a vertical axis 1111. An absorptive unit 113, acting as a coupling mechanism, is positioned around the base of the shaft 111 on the first surface 112, and has a hole 118A for receiving the shaft 111 into the body 11. A magnet 116A has a central hole that receives the shaft 111, and the magnet 116A is seated around the absorptive unit 113 in a well 1121 that is recessed from the first surface 112. In addition, at least two fastening elements 114 (e.g., screws) are provided to fasten the body 11 to a triangular angle gauge 80 (as described below). The body 11 also has at least one containing room 115. A second or bottom surface 117 is defined on the bottom of the body 11.

The second part has a rotating unit 13, which has a housing with four side walls that define an interior space for retaining a laser head 131. The laser head 131 contains a laser diode for emitting laser planes. A metal plate 161B is attached (e.g., using screws 162) to the bottom of the housing of the rotating unit 13, and is adapted to be magnetically coupled to the magnet 161A via the magnetic force emitted from the magnet 116A. Thus, the absorptive unit 13 and its magnet 161A function to rotatably couple the rotating unit 13 to the body 11. When coupled to the body 11, the rotating unit 13 rotates about the axis 1111 defined by the shaft 111, and the laser head.131 emits a laser plane with an angle range of up to 180 degrees. The laser plane is parallel to the axis line 1111 and rotates around the axis 1111. The laser head 131 is received inside a sleeve-like holder 132, and the holder 132 is slid through the bore of a cylindrical wall 1331 that is provided in one side wall 1311 of the housing of the rotating unit 13. The holder 132 functions to adjust the emitting angles of the laser plane. The holder 132 has two threaded holes 137 for receiving two corresponding screws 138, which function to secure the laser head 131 inside the holder 132. A fixing structure 136 is provided on the bottom wall of the rotating unit 13 and is adapted to couple the shaft 111 of the body 11. Three pins 135 are riveted to couple the fixing structure 136 of the rotating unit 13 to the shaft 111, and then a C-shaped ring 134 is fitted around the shaft 111. In particular, the shaft 111 extends through the magnet 161A, the plate 161B and the fixing structure 136 before it is clamped by the C-shaped ring 134 to rotatably secure the shaft 111 to the rotating unit 13 together. A top cover 133 is provided to cover the top of the housing for the rotating unit 13.

The third part has a power supply unit 15, which is retained in the containing room 115 of the body 11. The power supply unit 15 includes one or more (e.g., two) batteries 151, one power switch 152 and one battery cover 153, with the two batteries 151 electrically connected to the laser head 131 to supply power to the laser head 131.

Figure 3:
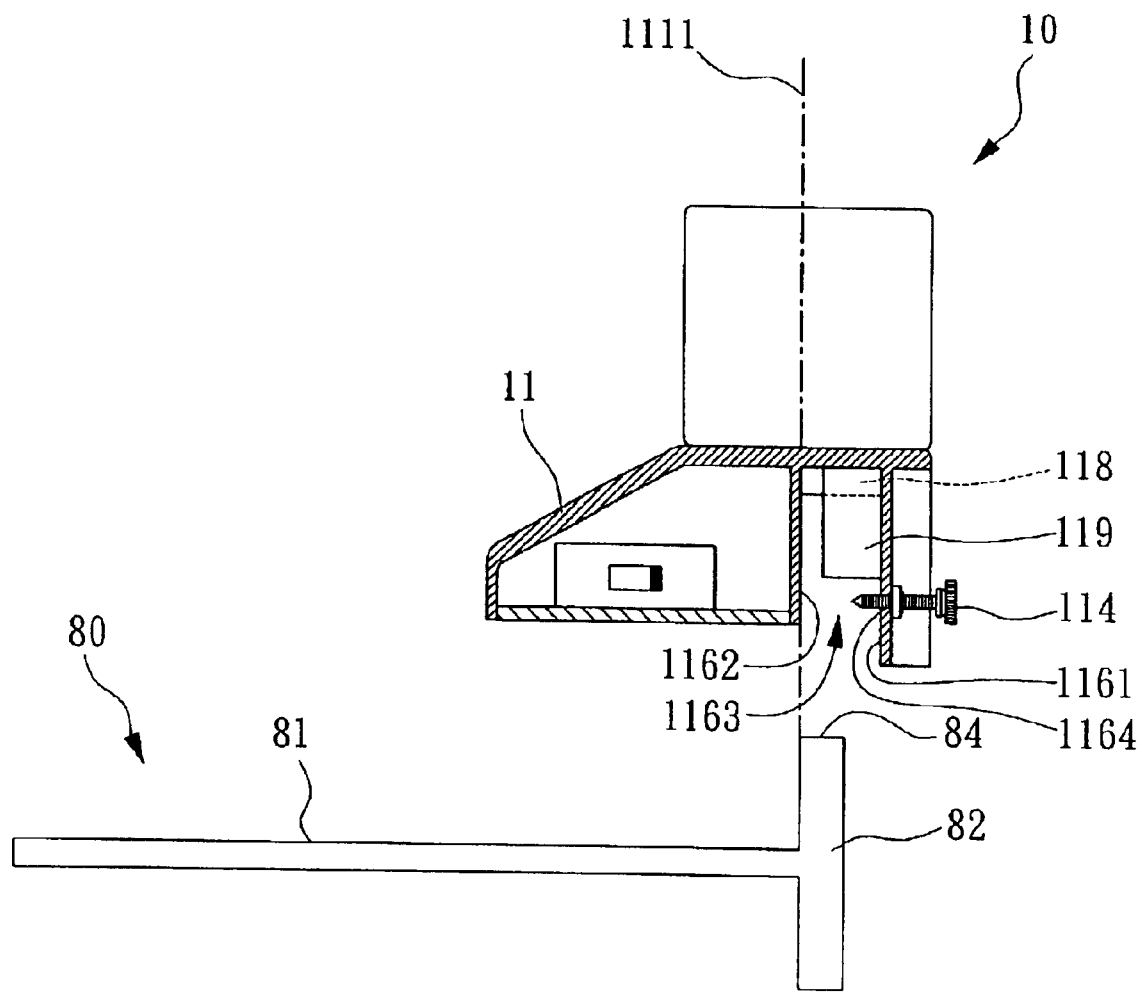
FIG. 3 is a cross-sectional view of the universal angle gauge and angle gauge of FIG. 2 taken along the line A—A in FIG. 2.
Figure 4:
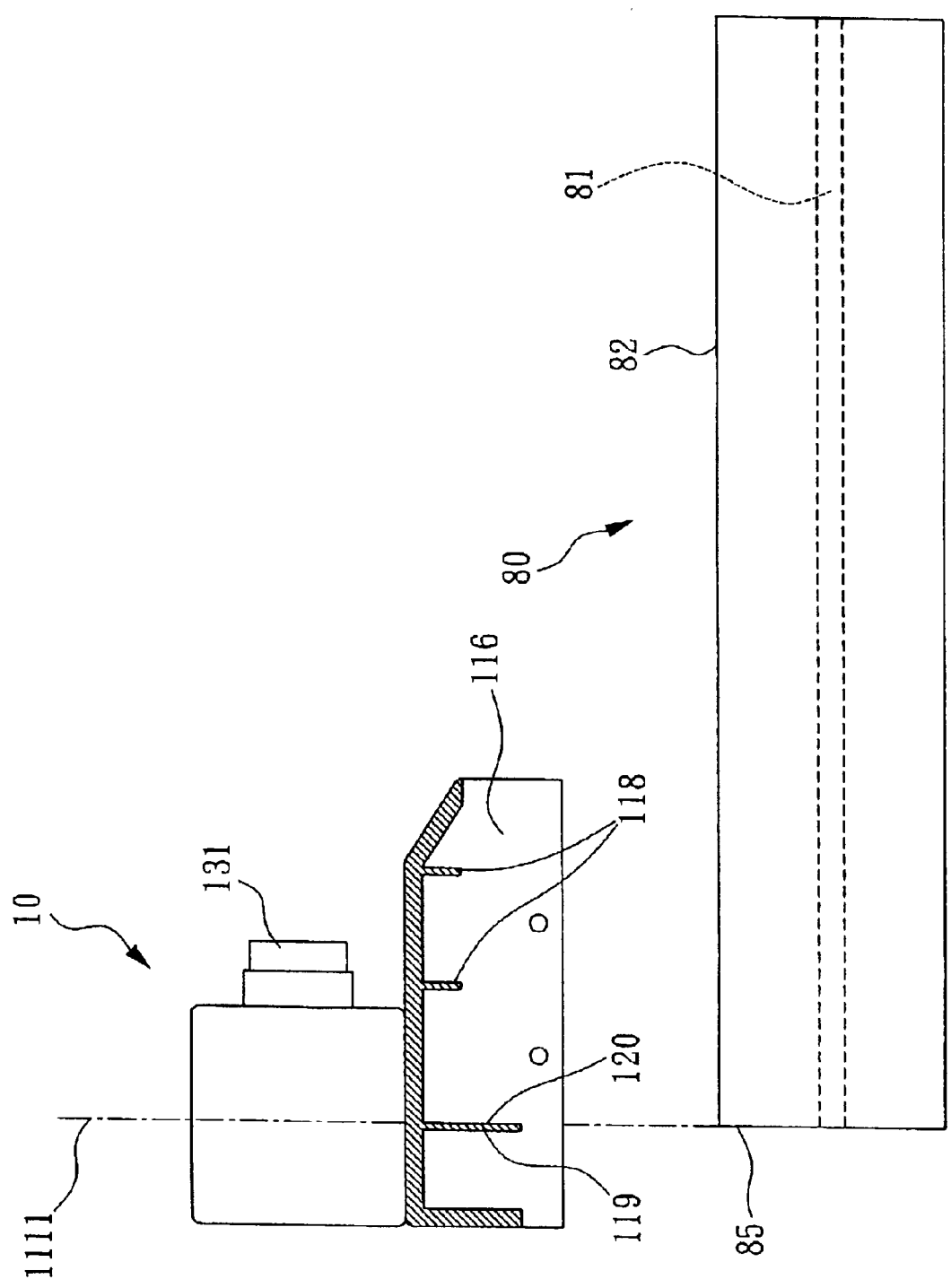
FIG. 4 is a cross-sectional view of the universal angle gauge and angle gauge of FIG. 2 taken along the line B—B in FIG. 2.

FIG. 2 illustrates how the universal angle gauge 10 is used with a triangular angle gauge 80. As shown in FIG. 2, the universal angle gauge 10 is carried on an obverse side 81 of the triangular angle gauge 80. The universal angle gauge 10 further includes a fillister 116 that is carried on the second surface 117 of the body 11. Referring also to FIGS. 3 and 4, the fillister 116 has two longitudinal walls 1161 and 1162 that define a longitudinal groove 1163 therebetween. Two supporting blocks 118, and at least one obstructer 119 that has a blocking surface 120, are provided inside the groove 1163.

An obverse rim 82 of the obverse side 81 of triangular angle gauge 80 is inserted into the longitudinal groove 1163 of the fillister 116, and a first side 84 of the obverse rim 82 is positioned against the two supporting blocks 118 (see FIG. 3). As the obverse rim 82 moves within the longitudinal groove 1163, its motion is impeded by the obstructer 119 when the second side 85 of the obverse rim 82 abuts the blocking surface 120 of the obstructer 119. With the obverse rim 82 retained inside the longitudinal groove 1163, the two fastening elements 114 can be inserted through openings 1164 in the wall 1161 to couple the body 11 and the triangular angle gauge 80 together. The blocking surface 120 of the obstructer 119 and supporting blocks 118 are aligned with the axis 1111, so a vertical line 83 of the triangular angle gauge 80 can also be aligned with the axis 1111. The rotating unit 13 rotates about the axis 1111 so that the laser head 131 also rotates about the axis 1111 as the laser head 131 emits a laser plane for civil engineering positioning.

Figure 5:
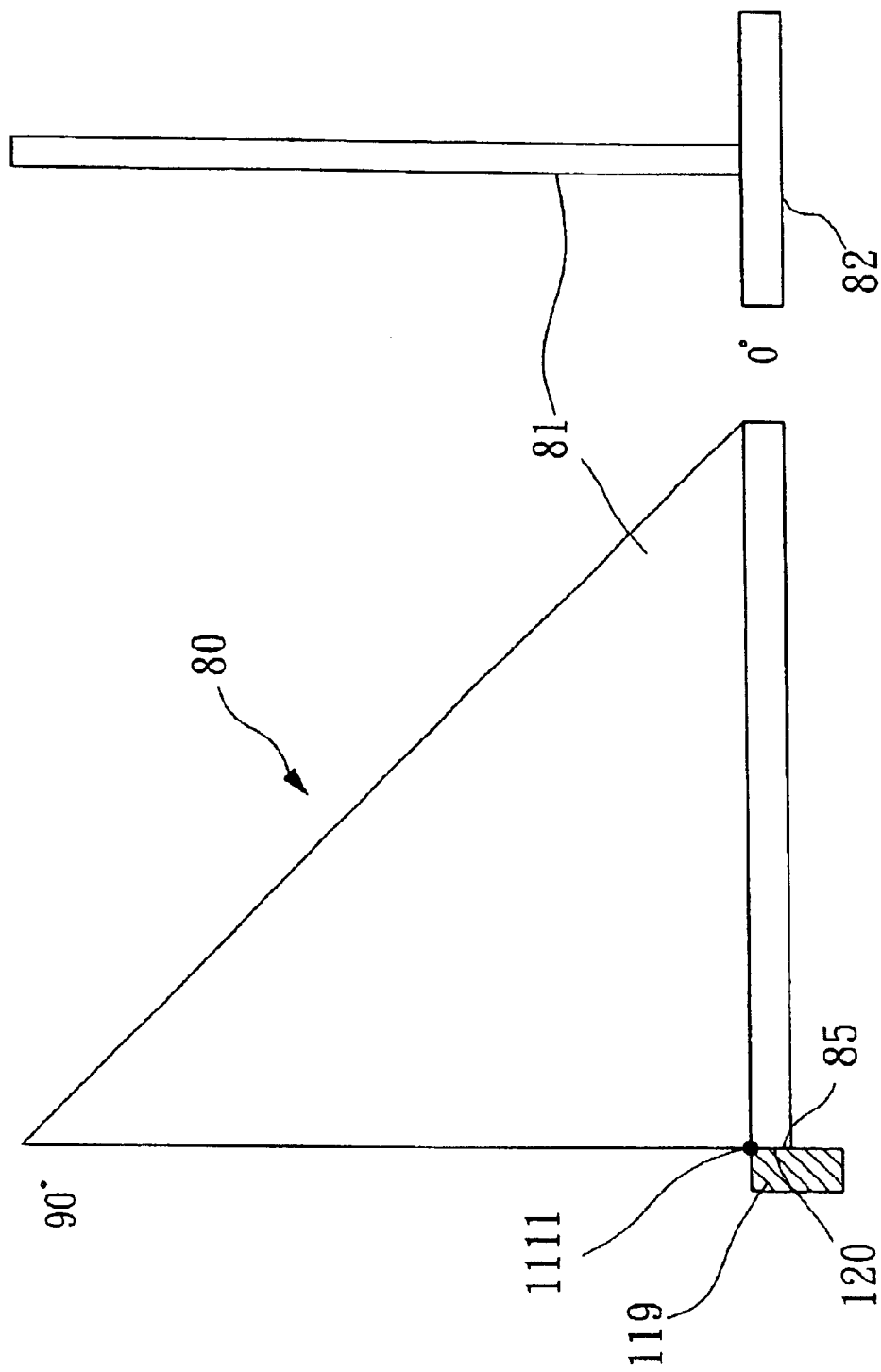
FIG. 5 is a top plan view of a fillister, an obstructer and the triangular angle gauge of FIG. 2.

As best shown in FIG. 3, when the body 11 is fixed to the triangular angle gauge 80, because the two supporting blocks 118 are aligned with the axis 1111, the fact that the first side 84 of the obverse rim 82 abuts and is aligned with the supporting blocks 118 also means that the first side 84 of the obverse rim 82 will be aligned with the axis 1111. Similarly, as best shown in FIG. 4, when the body 11 is fixed to the triangular angle gauge 80, because the blocking surface 120 of the obstructer 119 is aligned with the axis 1111, the fact that the second side 85 of the obverse rim 82 abuts and is aligned with the blocking surface 120 also means that the second side 85 of the obverse rim 82 will be aligned with the axis 1111. This is also shown in FIG. 5, which is a top plan view illustrating the alignment of the second side 85 of the obverse rim 82 with the blocking surface 120 of the obstructer 119, and how the axis 1111 is aligned with the second side 85 and the blocking surface 120.

Figure 6:
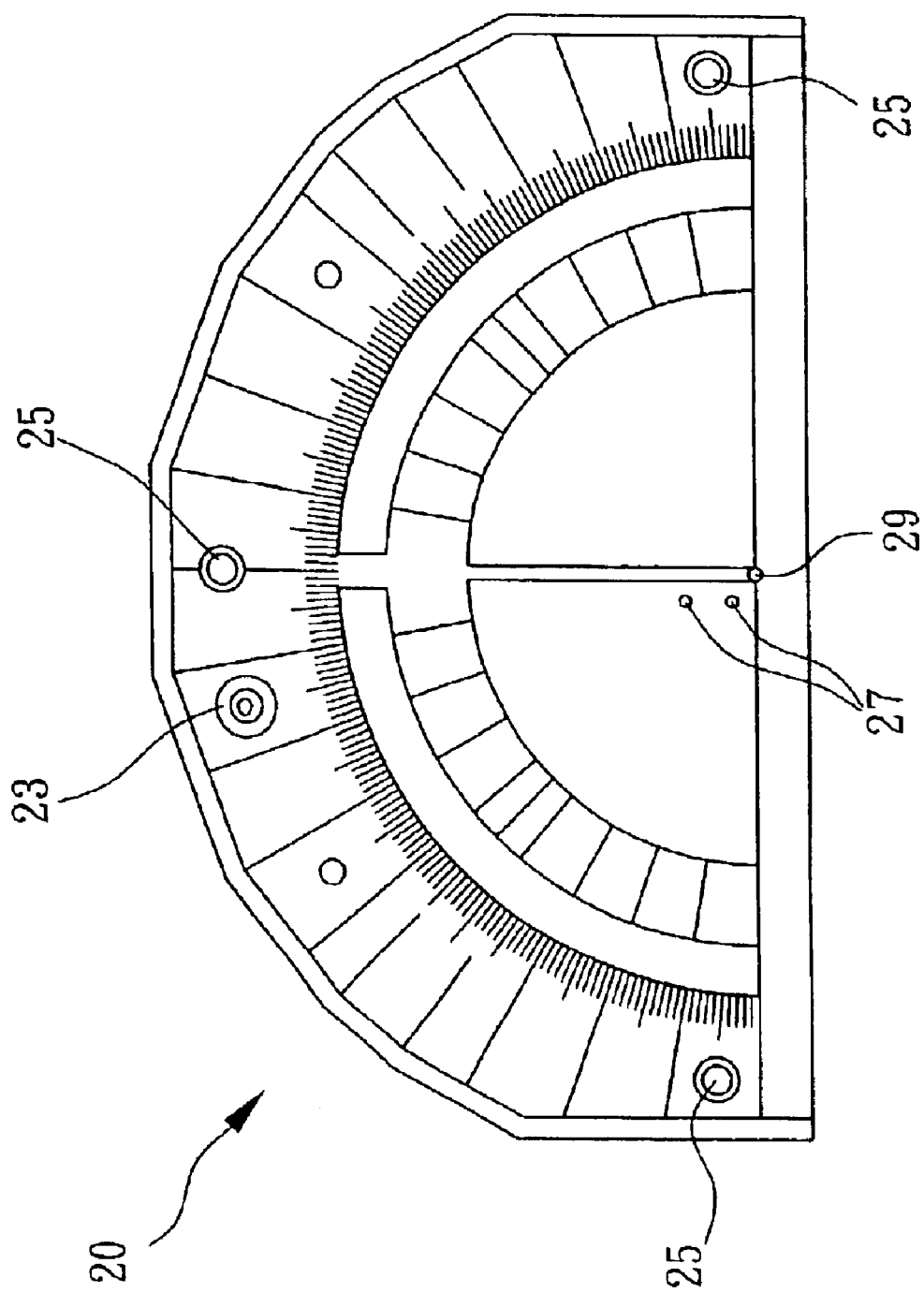
FIG. 6 is a top plan view of a disk angle gauge that can be used with the universal angle gauge of FIGS. 1 and 2.

FIG. 6 illustrates a disk angle gauge 20 that can be used with the universal angle gauge 10 of FIGS. 1–5. The disk angle gauge 20 has a generally semi-circular configuration with two fixing pins 27 provided along a straight edge 28 (see FIG. 7). The fixing pins 27 are adapted to fix the universal angle gauge 10 on the disk angle gauge 20 when assembling the universal angle gauge 10 with the disk angle gauge 20. Three leveling holes 25 are spaced apart along the curved edge of the disk angle gauge 20, and each is adapted to receive a respective leveling screw 21 (see FIG. 7). The three leveling screws 21 can be adjusted by the user for leveling the disk angle gauge 20 when the disk angle gauge 20 is placed on a non-horizontal or uneven plane. In addition, a bubble leveler 23 can be positioned on the disk angle gauge 20 for leveling positioning, and an axial central hole 29 is provided to correspond to the axis 1111.

Figure 7:
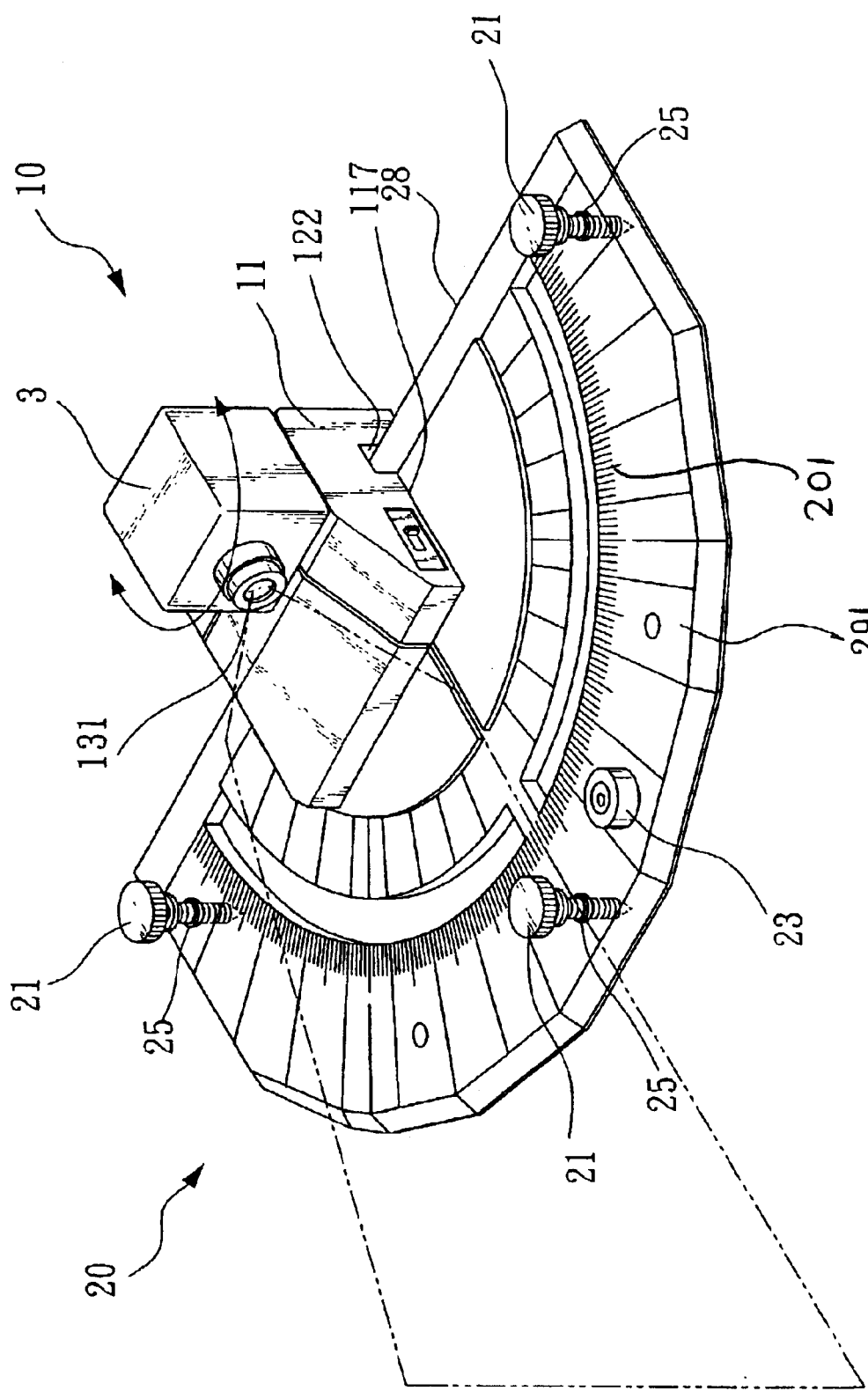
FIG. 7 is a perspective view illustrating the universal angle gauge of FIG. 1 in assembled form, and shown in use with a disk angle gauge.
Figure 8:
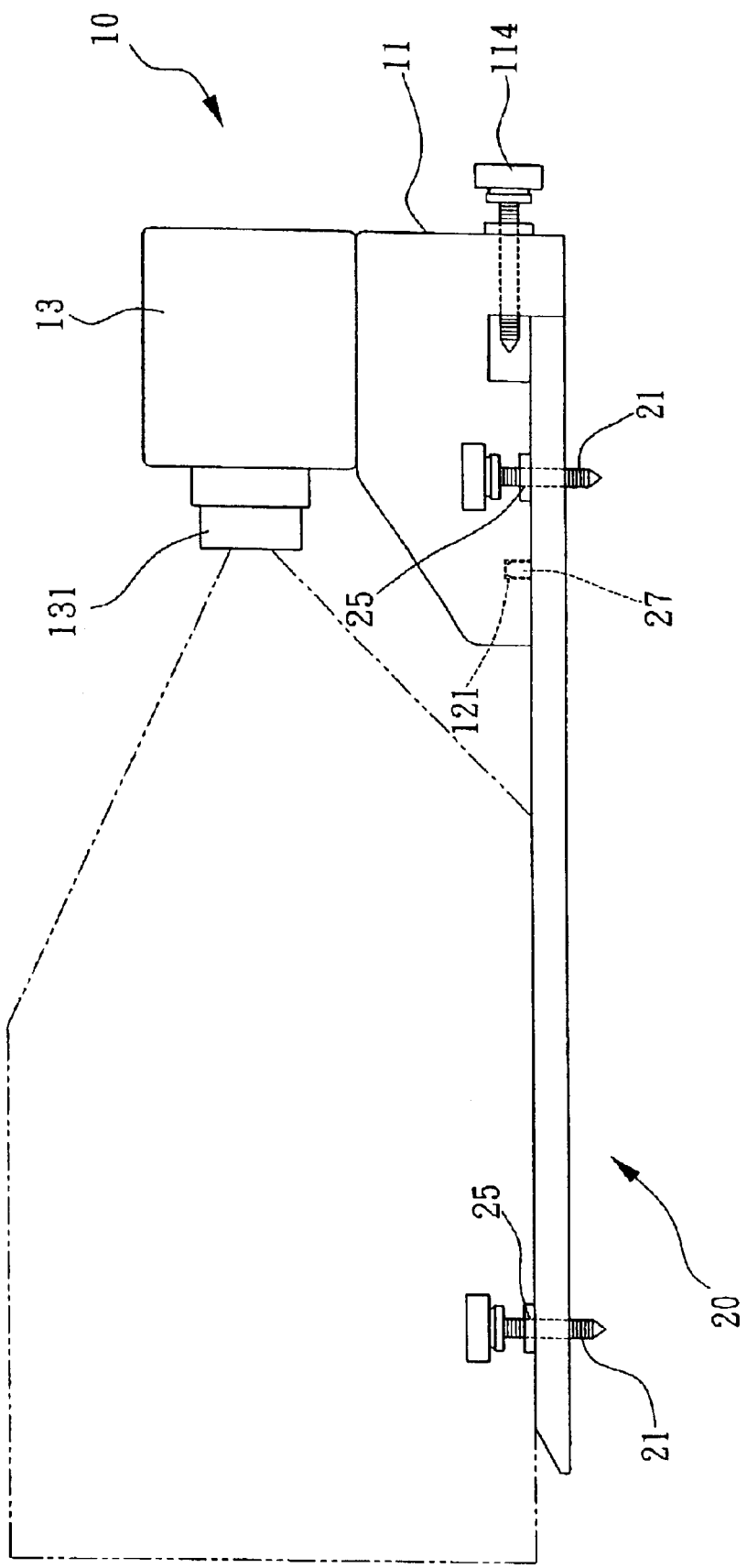
FIG. 8 is a side plan view of the universal angle gauge and angle gauge of FIG. 7.

FIG. 7 illustrates how the universal angle gauge 10 of FIG. 1 is used with the disk angle gauge 20. The second surface 117 of the body 11 is seated tightly against the top plane 291 of the disk angle gauge 20, and a vertical plane defined by the inner side 122 of the wall 1161 of the fillister 116 is now positioned against the straight edge 28 of the disk angle gauge 20. Referring to FIG. 8, two fixing slots 121 are provided in the second surface 117 of the body 11, and are adapted to receive the two fixing pins 27 on the disk angle gauge 20, thereby fixing the location of the universal angle gauge 10 with respect to the top plane 291 of the disk angle gauge 20. When the universal angle gauge 10 is coupled to the disk angle gauge 20, the rotating unit 13 can rotate, and the laser head 131 emits a laser plane (shown in dotted lines in FIG. 7) that is parallel to the axis 1111 and which extends along one of the scaled marks 201 along the disk angle gauge 20 so that the angle measurement (i.e., the degree of the laser plane) can be easily read off the scaled marks 201. Thus, if the universal angle gauge 10 is used with the disk angle gauge 20 in a room, a three-dimensional position can be measured. Further, the scaled marks on the disk angle gauge 20 extend for 180 degrees, which means that the combination of gauges 10 and 20 shown in FIG. 7 can measure or position twice as far as the combination of gauges 10 and 80 shown in FIG. 2.

Thus, the universal angle gauge 10 of the present invention, and the gauge combinations 10+80 and 10+20, are simple in design, are extremely portable in that they are light-weight and can be packaged and moved around conveniently, are easy to use, and are effective in angle measurement and positioning. When used with a triangular angle gauge and a disk angle gauge, the universal angle gauge 10 of the present invention can rotate about an axis so that its laser head 131 can emit a laser plane to extend to standard lines distributed in a two-dimensional or three-dimensional space depending on the scale marks of the triangular angle gauge or the disk angle gauge.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. An angle measurement and distance demarcation device, comprising:

a body having a first surface, an axis which extends from the first surface, and a containing room;

a rotating unit coupled for rotation about the axis, the rotating unit having a laser emitter;

a magnet positioned on the first surface for attracting the rotating unit to the body; and a power supply unit provided inside the containing room and coupled to the laser emitter for supplying power to the laser emitter.

2. The device of claim 1, wherein the body has a second surface, and further including a fillister coupled to the second surface of the body.

3. The device of claim 2, wherein the first surface is parallel to the second surface.

4. The device of claim 1, wherein the power supply unit comprises at least one battery, one switch and one electrical line.

5. The device of claim 1, wherein the laser emitter is positioned in the rotating unit in a manner that emits vertical laser planes that are parallel to the axis.

6. The device of claim 1, further including an absorptive unit positioned on the first surface of the body, with the magnet that is seated around the absorptive unit.

7. An angle measurement and distance demarcation device, comprising:

a body having a first surface, an axis which extends from the first surface, and a containing room;

a rotating unit coupled for rotation about the axis, the rotating unit having a laser emitter;

means provided around the Axis for 1 the rotating unit to the body; and a power supply unit provided inside the containing room and coupled to the laser emitter for supplying power to the laser emitter;

wherein the means includes a shaft extending from the first surface of the body along the axis, a magnet that attracts the rotating unit to the body, and a C-shaped ring that secures the shaft to the rotating unit.

8. An angle measurement and distance demarcation system, comprising:

(a) a first gauge, comprising:
a body having a first surface, and an axis which extends from the first surface;
a rotating unit coupled for rotation about the axis, the rotating unit having a laser emitter;
means provided around the axis for coupling the rotating unit to the body; and
a fillister having a longitudinal groove and a first side surface that is 1 the axis; and (b) a second gauge having a triangular configuration, a planar surface and a side rim that extends perpendicular to the planar surface, wherein only the side rim of the second gauge is removably retained inside the longitudinal groove of the fillister.

9. The system of claim 8, wherein the laser emitter is positioned in the rotating unit in a manner that emits vertical laser planes that are parallel to the axis.

10. The system of claim 8, wherein the coupling means includes a shaft extending from the first surface of the body along the axis, a magnet that attracts the rotating unit to the body, and a C-shaped ring that secures the shaft to the rotating unit.

11. The system of claim 8, wherein the body has a containing room, the system further including:

a power supply unit provided inside the containing room and coupled to the laser emitter for supplying power to the laser emitter.

12. The system of claim 11, wherein the power supply unit comprises at least one battery, one switch and one electrical line.

13. The system of claim 8, wherein the fillister further includes means for securing the side rim inside the longitudinal groove of the fillister.

14. An angle measurement and distance demarcation system, comprising:

(a) a first gauge, comprising:
a body having a top surface, a bottom surface, and an axis which extends from the top surface;
a rotating unit coupled for rotation about the axis, the rotating unit having a laser emitter;
means provided around the axis for coupling the rotating unit to the body; and
a fillister having a side wall surface that is parallel to the axis;

(b) a second gauge having a top surface, and a side edge that is positioned against the side wall surface of the fillister; and means for removably coupling the bottom surface of the body to the top surface of the second gauge.

15. The system of claim 14, wherein the removably coupling means includes at least two fixing holes provided on the body, and two corresponding pins provided on the top surface of the second gauge.

16. The system of claim 14, wherein the second gauge has a semi-circular configuration.

17. The system of claim 14, wherein the top surface of the body is parallel to the bottom surface of the body.

18. The system of claim 14, wherein the laser emitter is positioned in the rotating unit in a manner that emits vertical laser planes that are parallel to the axis.

19. The system of claim 14, wherein the coupling means includes a shaft extending from the top surface of the body along the axis, a magnetic force that attracts the rotating unit to the body, and a C-shaped ring that secures the shaft to the rotating unit.

20. The system of claim 14, wherein the body has a containing room, the system further including:

a power supply unit provided inside the containing room and coupled to the laser emitter for supplying power to the laser emitter.

21. The system of claim 20, wherein the power supply unit comprises at least one battery, one switch and one electrical line.

* * * * *